United States Patent
Rösing

(10) Patent No.: US 11,655,842 B2
(45) Date of Patent: May 23, 2023

(54) FASTENER ASSEMBLY

(71) Applicant: Fairchild Fasteners Europe—VSD GmbH, Hildesheim (DE)

(72) Inventor: Jürgen Rösing, Sehnde (DE)

(73) Assignee: Fairchild Fasteners Europe—VSD GMBH

(*) Notice: Subject to any disclaimer, the term of this patent is extended or adjusted under 35 U.S.C. 154(b) by 386 days.

(21) Appl. No.: 16/771,832

(22) PCT Filed: Dec. 17, 2018

(86) PCT No.: PCT/EP2018/085292
§ 371 (c)(1),
(2) Date: Jun. 11, 2020

(87) PCT Pub. No.: WO2019/121560
PCT Pub. Date: Jun. 27, 2019

(65) Prior Publication Data
US 2021/0207640 A1 Jul. 8, 2021

(30) Foreign Application Priority Data

Dec. 18, 2017 (WO) .................. PCT/EP2017/083331

(51) Int. Cl.
*F16B 31/00* (2006.01)
*F16B 31/02* (2006.01)
(Continued)

(52) U.S. Cl.
CPC ............ *F16B 31/00* (2013.01); *F16B 31/021* (2013.01); *F16B 37/00* (2013.01); *F16B 11/006* (2013.01)

(58) Field of Classification Search
CPC ........ F16B 11/006; F16B 31/00; F16B 31/02; F16B 31/021; F16B 31/025; F16B 31/028; F16B 37/00
(Continued)

(56) References Cited

U.S. PATENT DOCUMENTS 2,394,812 A 2/1946 Seitz
2,892,226 A * 6/1959 Bradney .................. B22C 7/04
403/343
(Continued)

FOREIGN PATENT DOCUMENTS

EP 0470470 A2 2/1992
WO 9603587 A1 2/1996

OTHER PUBLICATIONS

International Preliminary Report on Patentability of the International Searching Authority dated Mar. 20, 2020, for International Appln. No. PCT/EP2018/085292 filed Dec. 17, 2018, 17 pages.

*Primary Examiner* — Roberta S Delisle
(74) *Attorney, Agent, or Firm* — Boardman & Clark LLP

(57) ABSTRACT

Disclosed is a fastener assembly comprising at least one of a bolt member and a nut member; and a drive element adapted for engagement by an installation/driving tool, said drive element comprising a body. The body of the drive element is joined either to the bolt member or to the nut member by means of an interposed interlayer structure, the interlayer structure being adapted to fracture in torsional shear and/or tensile stress in response to a relative rotational and/or tensile force applied to the drive element with the installation/driving tool.

15 Claims, 2 Drawing Sheets

Figure 1:
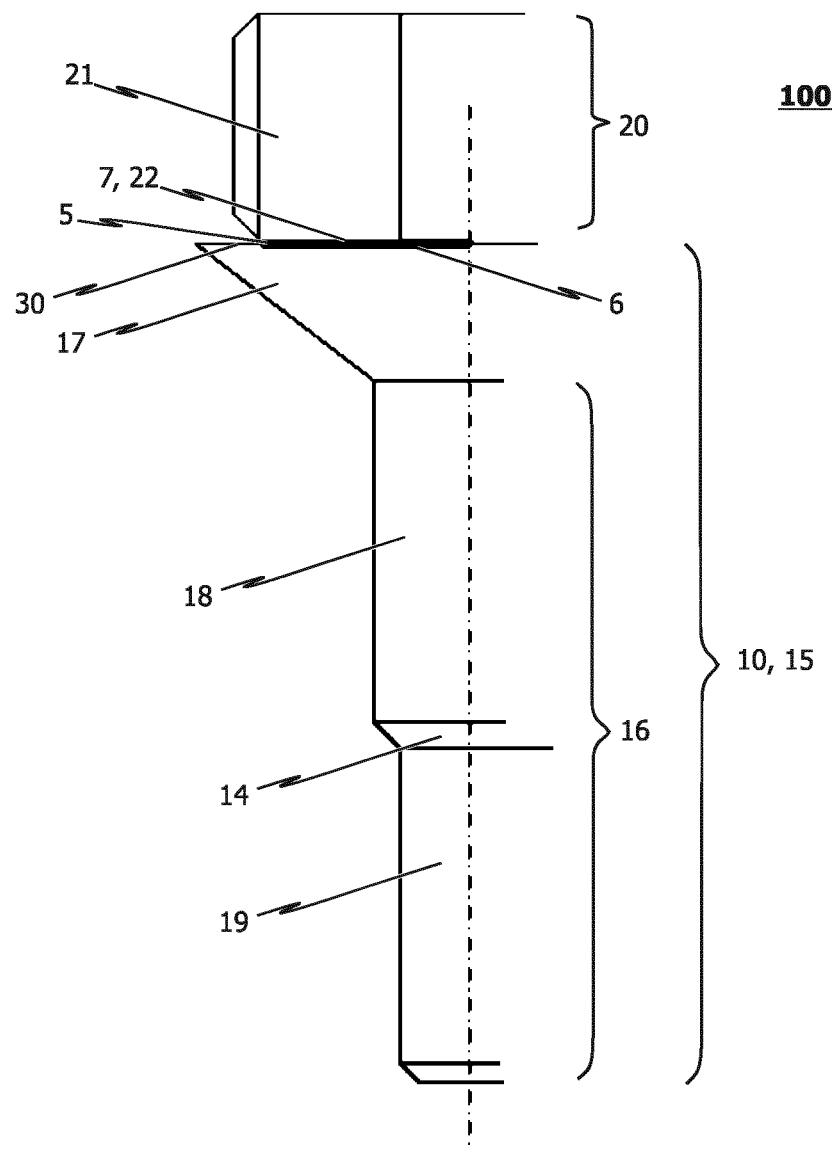

(51) Int. Cl.
*F16B 37/00* (2006.01)
*F16B 11/00* (2006.01)

(58) Field of Classification Search
USPC .......................................................... 411/1–5
See application file for complete search history.

(56) References Cited

U.S. PATENT DOCUMENTS

| | | | | |
|---|---|---|---|---|
| 3,498,174 | A * | 3/1970 | Hatter | F16B 31/021 |
| | | | | 411/5 |
| 3,937,121 | A * | 2/1976 | Schubert | F16B 31/021 |
| | | | | 411/2 |
| 5,499,892 | A * | 3/1996 | Reed | F16B 35/04 |
| | | | | 29/888.011 |
| 5,865,581 | A * | 2/1999 | Sadri | F16B 31/021 |
| | | | | 411/432 |
| 6,261,039 | B1 * | 7/2001 | Reed | B23P 6/04 |
| | | | | 411/399 |
| 7,980,801 | B2 * | 7/2011 | Kawano | F16B 23/00 |
| | | | | 411/399 |
| 10,024,352 | B2 * | 7/2018 | Huo | F16B 33/02 |
| 2008/0014042 | A1 * | 1/2008 | De France | F16B 31/021 |
| | | | | 411/432 |
| 2008/0226411 | A1 * | 9/2008 | McKinlay | B60B 3/16 |
| | | | | 411/43 |
| 2009/0092462 | A1 * | 4/2009 | Pratt | F16B 35/06 |
| | | | | 411/383 |
| 2017/0089383 | A1 | 3/2017 | Huo | |

\* cited by examiner

FASTENER ASSEMBLY

CROSS-REFERENCE TO RELATED APPLICATIONS

This application is a national phase filing of International Patent Application No. PCT/EP2018/085292, entitled "Fastener Assembly", which has an international filing date of Dec. 17, 2018, which claims priority to International Patent Application No. PCT/EP2017/083331, filed Dec. 18, 2017, the entire contents of each of which is hereby incorporated herein by reference for all purposes.

This invention relates to a fastener assembly, and, more particularly, to a fastener assembly which significantly reduces the installation expenditure especially when used in aerospace applications, and which is of enduring strength and reliability. According to some aspects of the present disclosure, the fastener assembly may comprise a bolt member. The bolt member of the fastener assembly may have an elongated shank adapted to be located in a hole through at least one workpiece or to be received in a blind hole, in particular a threaded blind hole. In addition thereto or as an alternative, the fastener assembly may comprise a nut member having a nut head portion and a hollow shank portion utilized for threaded engagement with a/the bolt member of the fastener assembly.

In general, complex man-made structures, whether stationary such as buildings and bridges, or mobile such as moving vehicles operating on land, sea, air, or space, are normally made from many components attached together forming a complex structure. The design of attachment points, commonly known as joints, requires special knowledge and skill for engineering design and analysis. A major part of this task is the selection of proper components, such as fasteners, for example for joining and fastening the structure together.

One purpose and objective in joint design is to facilitate the load transfer from one component of the structure to another component. The joined structure should be able to sustain the external and internal loads that may be experienced during its intended function. Loading may be in sustained static form or in a variable dynamic form. The functioning environment may be corrosive in nature affecting material properties and integrity of the fasteners and structural material. The operating environment may also undergo temperature changes affecting the load carrying characteristics of the joint and fasteners. All these factors should be considered in joint design and fastener selection.

Depending on the particular application, however, the join design may facilitate other tasks different from a load transfer from one component of the structure to another component. These other tasks may include, for example, sealing tasks performed by a fastener received within a pin hole.

Since man's original venture into building structures and moving vehicles, many types of fasteners have been conceived, developed, and used successfully. However, with an ever advancing civilization the need for continuous improvement is always evident. One common feature in most joint designs is to create holes, or apertures, in the joint components, typically referred to as workpieces, to insert and attach the components to each other by placing a suitable fastener in the matching holes. These fasteners, referred to by many different names and terms, are major contributors for constructing buildings, tools, vehicles, and other important structures comprising the present form of civilization and physical life.

Especially in the aerospace industry, various techniques have been used to ensure that threaded fasteners are secured with the requisite torque and that they stay secured during use. An example are blind fasteners which are commonly used to secure two or more workpieces together when it is otherwise impossible to access the underside (blind side) surface of one of the workpieces. Such fasteners have wide application in aircraft and space vehicle assembly. Due to the vibrations and sonic fatigue encountered in these environments, it is necessary to create a fastener of enduring strength and reliability.

The present disclosure, however, is not limited to fastener assemblies comprising blind fasteners. Rather, the present disclosure applies generally to fastener assemblies comprising at least one of a bolt member and a nut member.

In case the fastener assembly comprises a bolt member, the bolt member may have an elongated shank adapted to be located in a hole through at least one workpiece or to be received in a blind hole, in particular, a threaded blind hole.

In accordance with some embodiments of the present disclosure, the shank of the bolt member may include a threaded portion having a plurality of external bolt threads, the bolt threads of the bolt being defined by a plurality of crests and a plurality of roots. The threaded portion of the bolt member may be configured to receive a nut member, in particular a nut member of the fastener assembly. The nut member has a plurality of internal nut threads, the nut threads being sized and shaped to threadedly engage the bolt threads.

In accordance with some embodiments of the present disclosure, the threaded portion of the bolt member may be configured to be received by a threaded blind hole having a plurality of internal threads, the internal threads being sized and shaped to threadedly engage the bolt threads.

Generally, the bolt member has an externally threaded surface that allows the nut member or the threaded blind hole, which are each internally threaded, to be placed onto the threaded portion of the bolt member. The bolt member may have the shape of a long threaded bolt, also referred to as screw or pin member, with an enlarged head at one end of the bolt member.

In case the fastener assembly comprises a nut member, the nut member may have a nut head portion and a hollow shank portion utilized for threaded engagement with a bolt member, in particular with a bolt member of the fastener assembly.

In accordance with the present disclosure, the fastener assembly further comprises a drive element, for example a drive nut, adapted for engagement by an installation/driving tool. The drive element comprises a drive body that is joined either to the bolt member or to the nut member of the fastener assembly by means of an interposed interlayer structure.

The interlayer structure provides a frangible portion at a prescribed position between the drive element and the member of the fastener assembly to which the drive element is joined; i.e., either the bolt member or the nut member of the fastener assembly. For this purpose, the interlayer structure is configured and designed to fracture in torsional shear and/or tensile stress in response to a relative rotational and/or tensile force applied to the drive element with the installation/driving tool.

The purpose of this frangible portion is to prevent over torquing and/or excessive upsetting of the bolt member or nut member of the fastener assembly during installation by serving as a kind of "breakneck". When a certain installation load is achieved, the frangible portion prevents overloading by failing primarily in torsional shear and then breaking away from the assembly.

The driving element may be formed as a traditional drive nut, for example in the form of a traditional hexagon nut. On one end of the drive element may be a chamfered angle.

According to some embodiments disclosed herein, the assembly process of the fastener assembly may consist of the bolt member being placed into the hole through the at least one workpiece or into the threaded pin hole either until the threaded portion of the bolt member abuts the internal nut threads of a nut member or until the threaded portion of the bolt member abuts the internal threads of the threaded pin hole, followed by the nut member being threaded onto the threaded portion of the bolt member or followed by the threaded portion of the bolt member being threaded into the internal threads of the threaded pin hole. The installation process of the blind fastener is accomplished by use of an installation tool adapted to engage the drive element of the bolt member.

At a certain torsional and compressive load the bolt member stops rotating and the frangible portion between the bolt member and the drive element fails, causing the drive element and bolt member to separate.

According to other embodiments disclosed herein, the assembly process of the fastener assembly may consist of the hollow shank portion of the nut member being placed into the hole through the at least one workpiece until the internal nut threads of the nut member abuts the threaded portion of a bolt member, followed by the nut member being threaded onto the threaded portion of the bolt member. In these embodiments, the installation process of the blind fastener is accomplished by use of an installation tool adapted to engage the drive element of the nut member. At a certain torsional and compressive load the nut member stops rotating and the frangible portion between the nut member and the drive element fails, causing the drive element and nut member to separate.

With the present invention, optimum installation performance and reliability are achieved from the fastener assembly because the drive element utilized in the present invention is not anymore configured as a deformable drive nut as it is the case in the prior art, thereby avoiding undesired "jam nut effects". These undesired "jam nut effects" often take place in case a deformable drive nut rotates upon the head of the nut as the annular ridge of the drive nut deforms into the recess of the nut head. This deformation process causes rotation of the nut and smearing or scraping of the nut head.

This result is not only visually apparent, but can also deteriorate the nut's corrosion resisting properties and damage the plating under the head and grip area of the nut. Finally, the "jam nut effect" of the deformable drive nut causes large variations in the required installation loads. This can result in premature screw break off and inconsistencies in the amount of sleeve material that deforms into an expanded diameter, thus compromising the integrity of the blind fastener.

According to some aspects of the present disclosure, the present invention relates to a fastener assembly with a drive element and a fastener, wherein the drive element and the fastener are joined together by means of an interlayer structure adapted to fracture in torsional shear and/or tensile stress in response to a relative rotational and/or tensile force applied to the drive element with the installation/driving tool.

The fastener of the fastener assembly may include a bolt member having an elongated shank adapted to be located in a hole through at least one workpiece or to be received in a blind hole, in particular a threaded blind hole. The elongated shank has a first end and an opposite second end. The first end of the elongated shank of the bolt member and a body of the drive element are joined together by means of the interlayer structure interposed between the bolt member and the drive element. The improved interlayer structure is at least partly made of a material different from the material of the elongated shank of the bolt member and/or different from the material of the body of the drive element.

According to some embodiments disclosed herein, the fastener assembly may include a nut member having a nut head portion and a hollow shank portion with internal nut threads utilized for threaded engagement with a bolt member. The nut head portion of the nut member and a body of the drive element are joined together by means of the interlayer structure interposed between the nut member and the drive element. The improved interlayer structure is at least partly made of a material different from the material of the nut head portion of the nut member and/or different from the material of the body of the drive element.

The improvements of the present invention relate to a new structure for the shearable connection between the drive element and the fastener and to a new assembly process for the fastener. The new structure for the shearable connection between the drive element and the fastener significantly improves the reliability of the fastener by eliminating the inconsistencies associated with forcibly deforming the drive element and/or the head of the fastener during fracture of the shearable connection in torsional shear in response to a relative rotational force applied to the drive element with the installation/driving tool.

Consequently, the present invention addresses the need for fastener assemblies with a non-deformable drive nut for insuring that the pin member of the fastener assembly is initially applied at the requisite torque, whereby at the same time all of the problems associated with "jam nut effect" are eliminated.

According to one aspect of the present invention, the material of the interlayer structure may be selected such that the interlayer structure provides a shearable connection between the drive element and the member (i.e., bolt member or nut member) of the fastener assembly to which the drive element is joined. For example, the interlayer structure may be made of aluminium or an aluminium alloy whereas the drive element and the fastener are preferably made of a composition having a higher shear modulus than the material of the interlayer structure. The material of the drive element and/or the fastener may, for example, be a Titanium alloy, such as Ti-6Al-4V, Ti-3Al-2.5V, or CpTi.

Preferably, the bolt member is made of an alloy comprising titanium and/or aluminum, and wherein the first drive element is made of steel, in particular stainless steel.

According to preferred embodiments of the inventive fastener assembly, the first interlayer structure is formed by joining the drive element to the bolt member of the fastener assembly by means of welding processes like friction stir welding, brazing and/or soldering.

In an advantageous way, the drive element is made of a low-priced material compared to the material of the bolt member, such as steel or stainless steel. In this way, the drive element can be pre-produced in a much higher quantity if it is used for different bolts or fastener. In addition, it is not imperative that the drive element shall be recycled as soon as it is sheared.

A drive element in a high-strength material can also transmit significantly higher torques (if the brazing/soldering/friction weld is correctly designed and dimensioned). Also a bolt member, which has been designed for heavy loads and only has a relatively small head, can be tightened with a higher torque, because the drive element in the actual head does not weaken the component.

It is particularly preferred that the drive element is connected to bolt member via a brazing/friction weld seam. This allows the necessary heat treatment of the component to be combined with the joining process. In addition, with suitable parameter selection, the solder joint can virtually disappear, so that no interface can be recognized (complete diffusion soldering/brazing).

In addition, any subarea can be defined as an interface— e.g. a ring or a rectangular interface.

In particular, the shearing torque can be defined very precisely, since the decisive parameters (solder seam thickness, soldering/brazing surface, strength of the soldering/brazing joint through a suitable heat treatment process) can all be deliberately set.

In accordance with some embodiments disclosed herein, the material of the drive element and/or the fastener may, for example, be a aluminum alloy, such as 2024-T4, 6061-T6, or 7075-T6, or a carbon steel, for example AISI 1000-1025, AISI 1030-1050 and similar, or a steel alloy, such as 4130, 4340, 8740 or similar, or stainless steel, such as 18-8, SS300/400 series, A-286, PH13-8, PH15-5, or PH17-4, or nickel alloys, such as Inconel 718, Monel, Waspalloy or Hastelloy, or cooper alloys, such as CuAl, CuBe or CuNi.

Preferably, the interlayer structure is at least partly made of a material having a shear modulus less than the shear modulus of the material of the member (i.e., bolt member or nut member) of the fastener assembly to which the drive element is joined, and less than the material of the body of the drive element.

In some embodiments, the interlayer structure is at least partly made of a material having a shear modulus less than 125 GPa at room temperature, preferably less than 85 GPa at room temperature, and more preferable less than 50 GPa at room temperature. In some embodiments, the interlayer structure is at least partly made of a material having a shear modulus less than 35 GPa at room temperature, and preferably less than 30 GPa at room temperature.

In some embodiments, the interlayer structure has a thickness of between about 0.2 μm and about 5.0 mm, preferably of between about 0.25 μm and about 1.0 mm, and more preferably of between about 0.2 μm and about 500.0 μm In accordance with some embodiments of the inventive fastener assembly disclosed herein, the material of the interlayer structure and/or the thickness of the interlayer structure and/or an effective joint face between the interlayer structure and the member (i.e., bolt member or nut member) of the fastener assembly to which the drive element is joined and/or an effective joint face between the interlayer structure and the body of the drive element are/is selected such as to fracture in torsional shear and/or tensile stress in response to a predetermined rotational force and/or tensile force applied to the drive element with the installation/driving tool.

In accordance with some embodiments of the inventive fastener assembly disclosed herein, the interlayer structure has a first surface facing an end of the member (i.e., bolt member or nut member) of the fastener assembly to which the drive element is joined, and a second surface facing an end of the body of the drive element, wherein the first surface of the interlayer structure is at least partly joined to the member (i.e., bolt member or nut member) of the fastener assembly to which the drive element is joined by means of a material-locking joint, and/or wherein the second surface of the interlayer structure is at least partly joined to the end of the body of the drive element by means of a material-locking joint.

The material-locking joint may be formed by brazing or soldering. In this case, the interlayer structure is preferably made of a material comprising: magnesium, aluminum, silicon, cooper, tin, zinc, silver, nickel, titanium, gold and/or chromium. As an alternative, the material-locking joint may be an adhesive bond. In this case, the interlayer structure is preferably made of an inorganic or organic compound or silicone comprising especially: methyl methacrylate, epoxy resins and/or polyester resin.

In accordance with some embodiments of the inventive fastener assembly disclosed herein, the drive element comprises at least one engaging/driving surface for engaging the installation/driving tool and/or for rotating the bolt member of the fastener assembly during installation.

In accordance with some embodiments of the inventive fastener assembly disclosed herein, the shank of the bolt member terminates at one end in an enlarged head, wherein the interlayer structure is provided between the enlarged head and the body of the drive element.

The shank of the bolt member may include a threaded portion having a plurality of external bolt threads, wherein the bolt threads of the bolt are defined by a plurality of crests and a plurality of roots. The threaded portion of the bolt member may be configured to receive a nut having a plurality of internal nut threads, wherein the nut threads are sized and shaped to threadedly engage the bolt threads.

In accordance with some embodiments disclosed herein, the shank of the bolt member may include a threaded portion having a plurality of external bolt threads, wherein the bolt threads of the bolt are defined by a plurality of crests and a plurality of roots. In this case, the threaded portion of the bolt member may be configured to be received by a threaded blind hole having a plurality of internal threads, wherein the internal threads are sized and shaped to threadedly engage the bolt threads.

In accordance with some embodiments of the present invention, the fastener assembly is configured for securing two or more workpieces together, wherein the two or more workpieces have an accessible side workpiece and a blind side workpiece. In this case, the fastener of the fastener assembly may be a blind fastener comprising a generally tubular sleeve body received within openings in the workpieces. The sleeve body may have a rearward tapered end projecting rearwardly beyond the blind side workpiece. The sleeve body may further comprise an enlarged body head for engagement with an outer surface of the accessible side workpiece. The elongated shank of the bolt member may have a straight smooth portion received within the sleeve body and a threaded portion at one end of the bolt member projecting rearwardly beyond the blind side workpiece.

With these embodiments of the present invention, the enlarged pin head of the bolt member and the body of the drive element may be joined together by means of the interlayer structure, wherein the interlayer structure has an axial strength at least equal to the maximum axial load required to push said bolt member fully into the aligned holes.

In accordance with some embodiments of the present invention, the bolt member of the fastener has an enlarged pin head, a first cylindrical shank portion having an outer diameter, and a tapered transition portion merging the first cylindrical shank portion with a second cylindrical shank portion.

The fastener assembly may further comprise a sleeve adapted to fit over the first cylindrical shank portion. The sleeve may have a length greater than or equal to a depth of the aligned holes. Moreover, the sleeve may have an enlarged head at one end, and a tubular portion having an inner diameter less than the outer diameter of the first cylindrical shank portion of the bolt member and an outer diameter less than the diameter of the aligned holes.

According to these embodiments of the present invention, the first cylindrical shank portion may expand radially the sleeve into an interference fit with the workpieces upon insertion of the first cylindrical shank portion of the bolt member into the aligned holes.

With these embodiments of the present invention, the second cylindrical shank portion of the bolt member and the body of the drive element are joined together by means of the interlayer structure, and wherein the interlayer structure has an axial strength at least equal to the maximum axial load required to pull said bolt member fully into the aligned holes.

The assembly process of the fastener assembly comprising the new interlayer structure for joining the drive element and the fastener together also differs from that previously utilized. Unlike the previously available drive element having a deformable annular ridge or a local weakening between the drive element and the fastener, the interlayer structure interposed between the drive element and the fastener has no "jam nut effect". The interlayer structure eliminates the unpredictability of installation loads placed on the fastener by not forcibly deforming against the nut head. This in turn greatly reduces the risk of premature fastener break off and increases consistency in the amount of material that will be deformed.

The fastener and, particularly the bolt member of the fastener, and the drive element are preferably of a material which is capable of considerable angular deformation without shearing. This is in contrast to the shearable parts of the fastener which will generally be formed integrally in a material (most commonly metal) which yields without substantial angular deformation. In other applications (e.g. where electrical conductivity is not required), relatively brittle plastics material may be used for the shearable interlayer structure. Suitable materials for the interlayer structure may include suitable plastics, as well as metals such as mild steel and annealed aluminium.

According to some embodiments disclosed herein, the material of the interlayer structure corresponds—at least partly—to the material of the member of the fastener assembly to which the drive element is joined. In such a case, the interlayer structure may be formed by joining the drive element either to the bolt member or to the nut member by means of a friction stir or alternative welding, brazing, soldering, gluing or alternative joining process.

According to other embodiments disclosed herein, the material of the interlayer structure corresponds—at least partly—to the material of the drive element. In this case, the interlayer structure may be formed by joining the drive element either to the bolt member or to the nut member by means of a friction stir or alternative welding, brazing, soldering, gluing or alternative joining process.

According to another aspect of the invention, there is thus provided a shearable fastener assembly comprising a fastener capable of securing two or more workpieces together and a shearable drive element adapted to shear from the fastener upon the application of a predetermined torque, the fastener and the shearable drive element being formed separately and connected to each other by means of the improved interlayer structure so as to shear with relatively low angular deformation.

The extent of angular deformation between the fastener and the shearable drive element of the fastener assembly prior to shearing may be very low, e.g. less than 10°.

With the improved interlayer structure, the fastener retains its integrity during and after the interlayer structure fractures in torsional shear in response to a relative rotational force applied to the drive element with the installation/driving tool. In any case, shearing of the drive element takes place in a more controlled and smoother way, as compared with the prior art, reducing the risk of material distortion at the interface between the fastener and the drive element. In this regard, high shearing accuracy is achieved without causing jagged edges or burrs, thereby resulting in a smooth surface in the area where the fastener is installed.

Figure 2:
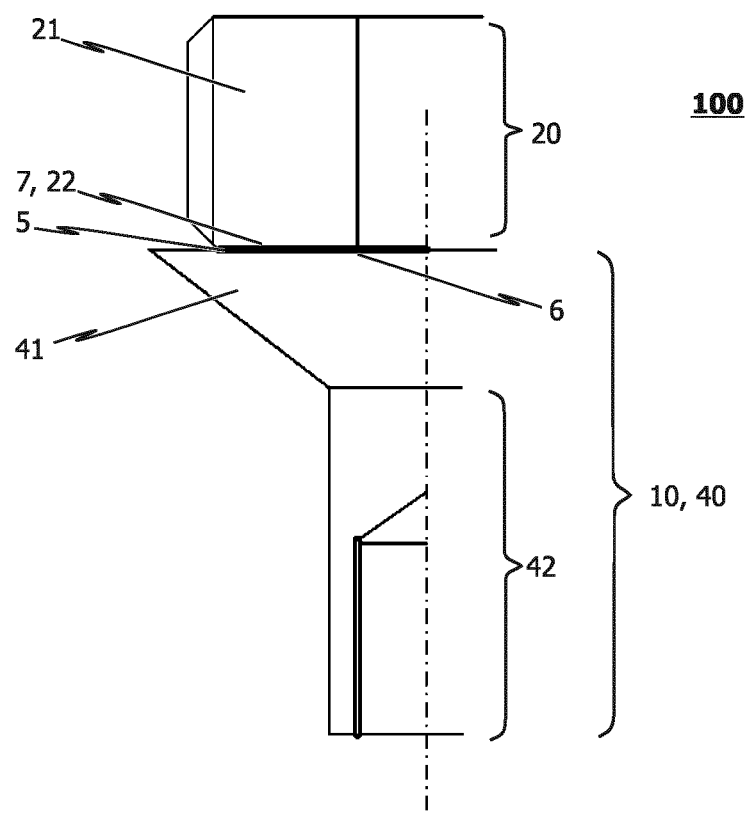

Other objects, features and advantages of the invention will be apparent from the following detailed description taken in connection with the accompanying drawings, in which FIG. 1 is a partial side view of a first embodiment according to the invention; and FIG. 2 is a partial side view of a second embodiment according to the invention.

A fastener 10 for securing together a plurality of workpieces and adapted to be located in aligned holes in such workpieces is disclosed. In exemplary embodiments, the fastener 10 includes a bolt member 15.

In some embodiments disclosed herein, the fastener 10 may further include a sleeve member (not illustrated in the drawings) and a collar (also not illustrated in the drawings). In other embodiments, the fastener 10 may include a nut instead of a collar.

In exemplary embodiments, the workpieces can be formed with a plurality of materials, the materials including composite, metallic, or composite/metallic structures, or any combination thereof. In particular embodiments, the workpieces may be constructed from steel, titanium, aluminum, graphite composites, or any combination thereof.

In exemplary embodiments, the fastener 10 may be provided with a drive element 20 adapted for engagement by an installation/driving tool. The drive element 20 and the bolt member 15 of the fastener 10 are joined together by means of an interposed interlayer structure 5. The interlayer structure 5 forms a frangible portion adapted to fracture in torsional shear in response to a relative rotational force applied to the drive element 20 with the installation/driving tool.

An embodiment of the bolt member 15 and drive element 20 is shown in FIG. 1. The bolt member 15 includes an elongated shank portion 16 which terminates at one end 30 with an enlarged flush head 17. Alternatively, the elongated shank portion 16 may also terminate at the one end 30 with a protruding head.

The shank portion 16 of the bolt member 15 may include a substantially smooth cylindrical portion 18, and a threaded portion 19. The smooth cylindrical shank portion 18 extends from the head 17 and may be adapted to be received by an expansion sleeve. Following the substantially smooth cylindrical shank portion 18 is a threaded portion 19. The threaded portion 19 is generally uniformly threaded throughout its length. A tapered transition portion 14 smoothly merges the threaded portion 19 with the smooth cylindrical shank portion 18.

In exemplary embodiments, the transition portion 14 may be tapered and have an angle of less than or equal to 20° from the pin shank as the diameter decreases radially from the smooth shank portion to the thread portion. In the embodiment illustrated in FIG. 1, the diameter of the transition portion 14 is tapered and decreases in a uniform fashion. However, the transition portion can be any shape as long as the radius of the pin shank decreases. For example, the transition portion could be a gentle radius decrease shaped as a convex curve, a concave curve or an s-shaped curve, or be in configuration that would allow a reduction in the radius between the smooth shank portion and the threaded portion of the pin.

The expansion sleeve member of the fastener assembly may have a generally uniform tubular portion that terminates in an enlarged flanged shaped head to receive the flush head 17 (or alternatively protruding head) of the bolt member 15. The sleeve has an internal diameter that is greater than the threaded portion 19 of the bolt member 15, but less than the diameter of the smooth cylindrical shank portion 18.

In accordance with some embodiments disclosed herein, the fastener 10 comprises a bolt member 15 and a drive element 20. The bolt member 15 has an elongated shank adapted to be located in a hole through at least one workpiece. The elongated shank of the bolt member 15 may also be adapted to be received in a blind hole, in particular a threaded blind hole. The drive element 20 of the fastener 10 is adapted for engagement by an installation/driving tool. The drive element 20 and the bolt member 15 of the fastener 10 are joined together by means of an interposed interlayer structure 5.

In some embodiments disclosed herein, the elongated shank of the bolt member 15 has a shape different from a cylindrical shape. The elongated shank or the bolt member 15 may, for example, be tapered.

As illustrated in FIG. 1, the fastener 10 may be provided with a drive element 20 adapted for engagement by an installation/driving tool. The drive element 20 and the fastener 10 are joined together by means of an interlayer structure 5 forming a frangible portion adapted to fracture in torsional shear in response to a relative rotational force applied to the drive element 20 with the installation/driving tool. As a result, the drive element 20 is a shearable part adapted to shear from the fastener 10 upon the application of a predetermined torque.

The shearable drive element 20 comprises a body 21 configured for engagement with a suitable installation/driving tool. The body 21 of the drive element 20 may have any suitable form, a square or hexagonal external shape being most preferred, though any non-circular form may be utilised for engagement of an installation/driving tool with the exterior of the body 21.

Alternatively, the body 21 of the drive element 20 may be provided with an axial bore of non-circular (e.g. square or hexagonal) cross-section such that installation/driving tool such as an Allen key may be inserted into the bore to apply the necessary torque to the drive element 20.

In exemplary embodiments, the drive element 20 and the fastener 10 are joined together by means of an interlayer structure 5 that forms a shearable part of the fastener assembly 100. The interlayer structure 5 may have a thickness of between about 0.2 µm and about 5.0 mm, preferably of between about 0.25 µm and about 1.0 mm, and more preferably of between about 0.2 µm and about 500.0 µm, thereby defining a predetermined shear plane between the drive element 20 and the fastener 10.

In more detail, the shear plane defined by the interlayer structure 5 results from the fact that the material of the interlayer structure 5 is selected such as to have a shear modulus less than the shear modulus of the material of the bolt member 15 of the fastener 10 and less than the material of the body 21 of the drive element 20. Especially in aerospace applications where high-strength fastener are commonly used, the interlayer structure is preferably at least partly made of a material having a shear modulus less than 35 GPa at room temperature, and more preferably less than 30 GPa at room temperature.

In some embodiments disclosed herein, the interlayer structure 5 is at least partly made of a material having a shear modulus less than 125 GPa at room temperature, preferably less than 85 GPa at room temperature, and more preferable less than 50 GPa at room temperature.

In the exemplary embodiment illustrated in FIG. 1, the interlayer structure 5 has a first surface 6 facing the first end 30 of the bolt member 15, and a second surface 7 facing an end 22 of the body 21 of the drive element 20. The first surface 6 of the interlayer structure 5 may be at least partly joined to the first end 30 of the bolt member 15 by means of a material-locking joint. In addition or alternatively, the second surface 7 of the interlayer structure 5 may be at least partly joined to the body 21 of the drive element 20 by means of a material-locking joint.

In some embodiments, the material-locking joint between the respective surface(s) of the interlayer structure 5 and the bolt member 15 and/or drive element 20 may be formed by brazing or soldering.

For example, the interlayer structure 5 may be formed by a multi-layered brazing composed of a core material, in particular core alloy, with a cladding layer on both sides preferably of a different aluminium alloy with a different melting point.

Alternatively, the interlayer structure 5 may be formed by a solder layer composed of a material, in particular aluminium alloy sheet, with a melting point less than the melting point of the material of the bolt member 15 and less than the melting point of the material of the body 21 of the drive element 20.

In some embodiments, the material-locking joint between the respective surface(s) of the interlayer structure 5 and the bolt member 15 and/or drive element 20 may be an adhesive bond.

Referring to FIG. 2, a second embodiment of a shearable fastener assembly according to the invention is generally designated 100. The fastener assembly 100 comprises a fastener 10 in the form of a capped nut member 40 having a nut head portion 41 and a hollow shank portion 42 utilized for threaded engagement with a bolt member 15 of the fastener assembly. The nut head portion 41 of the capped nut member 40 by an interlayer structure 5 to a drive element 20.

The drive element 20 on the nut head portion 41 can either be an internal hex, an external hex 21, as seen in FIG. 2, or any of a number of other standard drive configurations or anti-theft drive configurations as those skilled in the art will readily realize are suitable for such driver means.

Furthermore, metals thought to be suitable for the capped nut member 40 include steel, titanium, aluminum, graphite composites, or any combination thereof and other alloys as may occur to those skilled in the art.

The capped nut member 40, in addition to having a nut head portion 41, has a hollow shank comprising a first shank portion nearest the head portion 41 and an opposite second shank portion for engagement with a bolt member. The second shank portion is utilized for threaded engagement with the bolt member to provide a clamp force necessary for the fastening.

The nut head may be formed of a number of convenient and aesthetically pleasing forms, as a button type face as seen in FIG. 2 of the drawings.

As illustrated in FIG. 2, the nut head portion 41 of the nut member 40 is provided with a drive element 20 adapted for engagement by an installation/driving tool. The drive element 20 and the nut head portion 41 are joined together by means of an interlayer structure 5 forming a frangible portion adapted to fracture in torsional shear in response to a relative rotational force applied to the drive element 20 with the installation/driving tool. As a result, the drive element 20 is a shearable part adapted to shear from the nut head portion 41 upon the application of a predetermined torque.

The shearable drive element 20 comprises a body 21 configured for engagement with a suitable installation/driving tool. The body 21 of the drive element 20 may have any suitable form, a square or hexagonal external shape being most preferred, though any non-circular form may be utilised for engagement of an installation/driving tool with the exterior of the body 21.

Alternatively, the body 21 of the drive element 20 may be provided with an axial bore of non-circular (e.g. square or hexagonal) cross-section such that installation/driving tool such as an Allen key may be inserted into the bore to apply the necessary torque to the drive element 20.

In exemplary embodiments, the drive element 20 and the nut head portion 41 are joined together by means of an interlayer structure 5 that forms a shearable part of the fastener assembly 100. The interlayer structure 5 may have a thickness of between about 0.2 µm and about 5.0 mm, preferably of between about 0.25 µm and about 1.0 mm, and more preferably of between about 0.2 µm and about 500.0 µm, thereby defining a predetermined shear plane between the drive element 20 and the nut head portion 41.

As in the embodiment illustrated in FIG. 1, the shear plane defined by the interlayer structure 5 results from the fact that the material of the interlayer structure 5 is selected such as to have a shear modulus less than the shear modulus of the material of the nut head portion 41 of the fastener 10 and less than the material of the body 21 of the drive element 20. The interlayer structure is preferably at least partly made of a material having a shear modulus less than 35 GPa at room temperature, and more preferably less than 30 GPa at room temperature.

In the exemplary embodiment illustrated in FIG. 2, the interlayer structure 5 has a first surface 6 facing the nut head portion 41 of the nut member 40, and a second surface 7 facing an end 22 of the body 21 of the drive element 20. The first surface 6 of the interlayer structure 5 may be at least partly joined to the nut head portion 41 by means of a material-locking joint. In addition or alternatively, the second surface 7 of the interlayer structure 5 may be at least partly joined to the body 21 of the drive element 20 by means of a material-locking joint.

In some embodiments, the material-locking joint between the respective surface(s) of the interlayer structure 5 and the nut head portion 41 and/or drive element 20 may be formed by brazing or soldering.

Alternatively, the interlayer structure 5 may be formed by a solder layer composed of a material, in particular aluminium alloy sheet, with a melting point less than the melting point of the material of the nut head portion 41 and less than the melting point of the material of the body 21 of the drive element 20.

In some embodiments, the material-locking joint between the respective surface(s) of the interlayer structure 5 and the nut head portion 41 and/or drive element 20 may be an adhesive bond.

The assembly process of the fastener assembly 100 illustrated in FIG. 2 may consist of the hollow shank portion 42 of the nut member 40 being placed into the hole through the at least one workpiece until the internal nut threads of the of the hollow shank portion 42 abut a threaded portion of a bolt member, followed by the nut member being threaded onto the threaded portion of the bolt member. The installation process of the fastener 10 is accomplished by use of an installation tool adapted to engage the drive element 20 of the nut member 40.

Continued rotation of the fastener 10 (e.g. by means of a suitable socket wrench or other tool applied to the hexagonal body 21 of the drive element 20) increases the clamping force until a predetermined torque is reached. At that point, connection between the drive element 20 and the fastener 10 shears at the interlayer structure 5, releasing the drive element 20 from the fastener 10. In more detail, at a certain torsional and compressive load the nut member 40 stops rotating and the frangible portion between the nut member 40 and the drive element 20 fails, causing the drive element 20 and nut member 40 to separate.

Thus, a unique fastener assembly 100 is disclosed having a new structure for the shearable connection between the drive element and the fastener. The new structure for the shearable connection between the drive element and the fastener significantly improves the reliability of the fastener by eliminating the inconsistencies associated with forcibly deforming the drive element and/or the head of the fastener during fracture of the shearable connection in torsional shear in response to a relative rotational force applied to the drive element with the installation/driving tool.

While the above description contains many particulars, these should not be considered limitations on the scope of the disclosure, but rather a demonstration of embodiments thereof. The fastener and uses disclosed herein include any combination of the different species or embodiments disclosed.

The invention claimed is:

1. A fastener assembly comprising:
at least one of a bolt member and a nut member; and
a drive element adapted for engagement by an installation/driving tool, said drive element comprising a body;
wherein the body of the drive element is joined either to the bolt member or to the nut member by means of an interposed interlayer structure, the interlayer structure being adapted to fracture in torsional shear and/or tensile stress in response to a relative rotational and/or tensile force applied to the drive element with the installation/driving tool;
wherein the interlayer structure has a thickness of between about 0.2 µm and about 5.0 mm, preferably of between about 0.25 µm and about 1.0 mm, and more preferably of between about 0.2 µm and about 500.0 µm, wherein the thickness of the interlayer structure is selected such as to precisely define a shearing torque of the interlayer structure, wherein the drive element is completely removed from the bolt member or the nut member after triggering the interlayer structure, and
wherein the interlayer structure is formed by joining the drive element to the bolt member or to the nut member of the fastener assembly by means of friction stir, welding, brazing and/or soldering.

2. The fastener assembly according to claim 1,
wherein the interlayer structure is made—at least partly—of a material different from the material of the member of the fastener assembly to which the drive element is joined, and/or different from the material of the body of the drive element.

3. The fastener assembly according to claim 1,
wherein the material of the interlayer structure corresponds—at least partly—to the material of the member of the fastener assembly to which the drive element is joined, and wherein the interlayer structure is formed by joining the drive element either to the bolt member or to the nut member by means of a welding process like friction stir welding, brazing, soldering, gluing or alternative joining process; or
wherein the material of the interlayer structure corresponds—at least partly—to the material of the drive element, and wherein the interlayer structure is formed by joining the drive element either to the bolt member or to the nut member by means of a welding process like friction stir welding or alternative welding, brazing, soldering, gluing or alternative joining process.

4. The fastener assembly according to claim 1, wherein the material of the interlayer structure is selected such that the interlayer structure provides a shearable connection between the drive element and the member of the fastener assembly to which the drive element is joined.

5. The fastener assembly according to claim 1, wherein the interlayer structure is at least partly made of a material having a shear modulus less than the shear modulus of the material of the member of the fastener assembly to which the drive element is joined, and less than the material of the body of the drive element, wherein the interlayer structure is preferably made of a material having a shear modulus less than 125 GPa at room temperature, more preferably less than 85 GPa at room temperature, and even more preferable less than 50 GPa at room temperature.

6. The fastener assembly according to claim 1, wherein the material of the interlayer structure and/or the thickness of the interlayer structure and/or an effective joint face between the interlayer structure and the member of the fastener assembly to which the drive element is joined and/or an effective joint face between the interlayer structure and the body of the drive element are/is selected such as to fracture in torsional shear and/or tensile stress in response to a predetermined rotational force and/or tensile force applied to the drive element with the installation/driving tool.

7. The fastener assembly according to claim 6, wherein the material-locking joint is an adhesive bond, and wherein the interlayer structure is preferably made of an inorganic or organic compound or silicone comprising especially: methyl methacrylate, epoxy resins and/or polyester resin.

8. The fastener assembly according to claim 1, wherein the interlayer structure has a first surface facing an end of the member of the fastener assembly to which the drive element is joined, and a second surface facing an end of the body of the drive element, wherein the first surface of the interlayer structure is at least partly joined to the end of the member of the fastener assembly to which the drive element is joined by means of a material-locking joint, and/or wherein the second surface of the interlayer structure is at least partly joined to the end of the body of the drive element by means of a material-locking joint, wherein the material-locking joint is preferably formed by brazing, soldering or welding, in particular, friction stir welding, and wherein the interlayer structure is more preferably made of a material comprising: magnesium, aluminum, silicon, cooper, tin, zinc, silver, nickel, titanium, gold and/or chromium.

9. The fastener assembly according to claim 1, wherein the drive element comprises at least one engaging/driving surface for engaging the installation/driving tool and/or for rotating the member of the fastener assembly to which the drive element is joined during installation.

10. The fastener assembly according to claim 1, wherein the fastener assembly comprises a bolt member having an elongated shank adapted to be located in a hole through at least one workpiece or to be received in a blind hole, in particular a threaded blind hole, wherein the shank of the bolt member terminates at one end in an enlarged head, and wherein the interlayer structure is provided between the enlarged head and the body of the drive element.

11. The fastener assembly according to claim 10, wherein the shank of the bolt member includes a threaded portion having a plurality of external bolt threads, the bolt threads of the bolt being defined by a plurality of crests and a plurality of roots, and wherein the threaded portion of the bolt member is configured to receive a nut having a plurality of internal nut threads, the nut threads being sized and shaped to threadedly engage the bolt threads; or
wherein the shank of the bolt member includes a threaded portion having a plurality of external bolt threads, the bolt threads of the bolt being defined by a plurality of crests and a plurality of roots, and wherein the threaded portion of the bolt member is configured to be received by a threaded blind hole having a plurality of internal threads, the internal threads being sized and shaped to threadedly engage the bolt threads.

12. The fastener assembly according to claim 1, wherein the fastener assembly comprises a nut member having a nut head portion and a hollow shank portion utilized for threaded engagement with a bolt member of the fastener assembly, and wherein the interlayer structure is provided between the nut head portion of the nut member and the body of the drive element.

13. The fastener assembly according to claim 1, wherein the fastener assembly is configured for securing two or more workpieces together, wherein the two or more workpieces have an accessible side workpiece and a blind side workpiece, and wherein the fastener assembly is a blind fastener assembly comprising a generally tubular sleeve body received within openings in the workpieces, the sleeve body having a rearward tapered end projecting rearwardly beyond the blind side workpiece, and an enlarged body head for engagement with an outer surface of the accessible side workpiece, wherein the elongated shank of the bolt member has a straight smooth portion received within the sleeve body and a threaded portion at one end of the bolt member projecting rearwardly beyond the blind side workpiece, wherein the enlarged pin head of the bolt member and the body of the drive element are joined together by means of the interlayer structure, and wherein the interlayer structure has an axial strength at least equal to the maximum axial load required to push said bolt member fully into the aligned holes.

14. The fastener assembly according to claim 1, wherein the fastener assembly is configured for securing two or more workpieces together, and wherein the bolt member has an enlarged pin head, a first cylindrical shank portion having an outer diameter, and a tapered transition portion merging the first cylindrical shank portion with a second cylindrical shank portion;
wherein the fastener assembly further comprises a sleeve adapted to fit over the first cylindrical shank portion, the sleeve having a length greater than or equal to a depth of the aligned holes, the sleeve having an enlarged head at one end, and a tubular portion having an inner diameter less than the outer diameter of the first cylindrical shank portion of the bolt member and an outer diameter less than the diameter of the aligned holes; and wherein the first cylindrical shank portion expands radially the sleeve into an interference fit with the workpieces upon insertion of the first cylindrical shank portion of the bolt member into the aligned holes, wherein the second cylindrical shank portion of the bolt member and the body of the drive element are joined together by means of the interlayer structure, and wherein the interlayer structure has an axial strength at least equal to the maximum axial load required to pull said bolt member fully into the aligned holes.

15. The fastener assembly according to claim 1, wherein the bolt member is made of an alloy comprising titanium and/or aluminum, and wherein the drive element is made of steel, in particular stainless steel.

\* \* \* \* \*